(12) United States Patent
Brust et al.

(10) Patent No.: US 9,494,225 B2
(45) Date of Patent: Nov. 15, 2016

(54) ELECTRIC GENERATOR OIL PUMP DRIVEN GEAR

(71) Applicant: HAMILTON SUNDSTRAND CORPORATION, Windsor Locks, CT (US)

(72) Inventors: Eric A. Brust, Machesney Park, IL (US); Ted A. Martin, Byron, IL (US); Brady A. Manogue, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 367 days.

(21) Appl. No.: 14/181,849

(22) Filed: Feb. 17, 2014

(65) Prior Publication Data

US 2015/0233460 A1    Aug. 20, 2015

(51) Int. Cl.
| | | |
|---|---|---|
| *H02K 7/06* | (2006.01) | |
| *F16H 55/17* | (2006.01) | |
| *F16H 55/08* | (2006.01) | |
| *H02K 7/08* | (2006.01) | |

(52) U.S. Cl.
CPC .............. *F16H 55/17* (2013.01); *F16H 55/08* (2013.01); *H02K 7/08* (2013.01); *Y10T 74/1987* (2015.01); *Y10T 74/19642* (2015.01)

(58) Field of Classification Search
CPC ...... F16H 55/17; H02K 7/08; Y10T 74/1987
USPC .......................................................... 310/83
See application file for complete search history.

(56) References Cited

U.S. PATENT DOCUMENTS

| | | |
|---|---|---|
| 1,813,820 A | 7/1931 | Ross |
| 1,852,538 A | 4/1932 | Peterson |
| 4,201,276 A | 5/1980 | Bardin et al. |
| 4,262,224 A | 4/1981 | Kofink et al. |
| 7,055,323 B2 | 6/2006 | Idei et al. |
| 7,347,169 B2 | 3/2008 | Nagahashi et al. |
| 8,138,642 B2 | 3/2012 | Lemmers, Jr. et al. |
| 8,276,396 B2 | 10/2012 | Siegenthaler |
| 8,424,416 B2 | 4/2013 | Short et al. |
| 8,454,326 B2 | 6/2013 | Grosskopf et al. |
| 8,561,503 B2 | 10/2013 | Lemmers, Jr. et al. |
| 8,624,415 B2 | 1/2014 | Koenig |
| 9,145,964 B2 * | 9/2015 | Potts .......................... B23F 9/00 |
| 2005/0151436 A1 * | 7/2005 | Lantzy .................. H02K 7/1163 310/99 |
| 2010/0327684 A1 * | 12/2010 | Grosskopf .......... F16H 55/0806 310/83 |
| 2012/0255385 A1 | 10/2012 | Nakayama et al. |
| 2013/0319154 A1 * | 12/2013 | Obayashi ................. C21D 1/10 74/434 |

FOREIGN PATENT DOCUMENTS

WO    2010066724 A1    6/2010

OTHER PUBLICATIONS

European Search Report for European Application No. 15155282.5 mailed Apr. 25, 2016.

\* cited by examiner

*Primary Examiner* — Hanh Nguyen

(74) *Attorney, Agent, or Firm* — Carlson, Gaskey & Olds, PC

(57) ABSTRACT

A driven gear includes a radially outwardly extending flange. The radially outwardly extending flange extends along an axial distance defined along a center axis of the flange. The flange merges into a generally conical portion which, in turn, extends radially inwardly to a hub. The hub extends to a remote end. A first distance defined between the remote end of the hub and an end of the flange faces the remote end. A second distance is defined between ends of the flange, with gear teeth formed at an outer periphery. A ratio of the first distance to the second distance is between 2.54 and 2.82. An oil pump, a rotating portion for an electrical generator, and a generator are also disclosed.

16 Claims, 3 Drawing Sheets

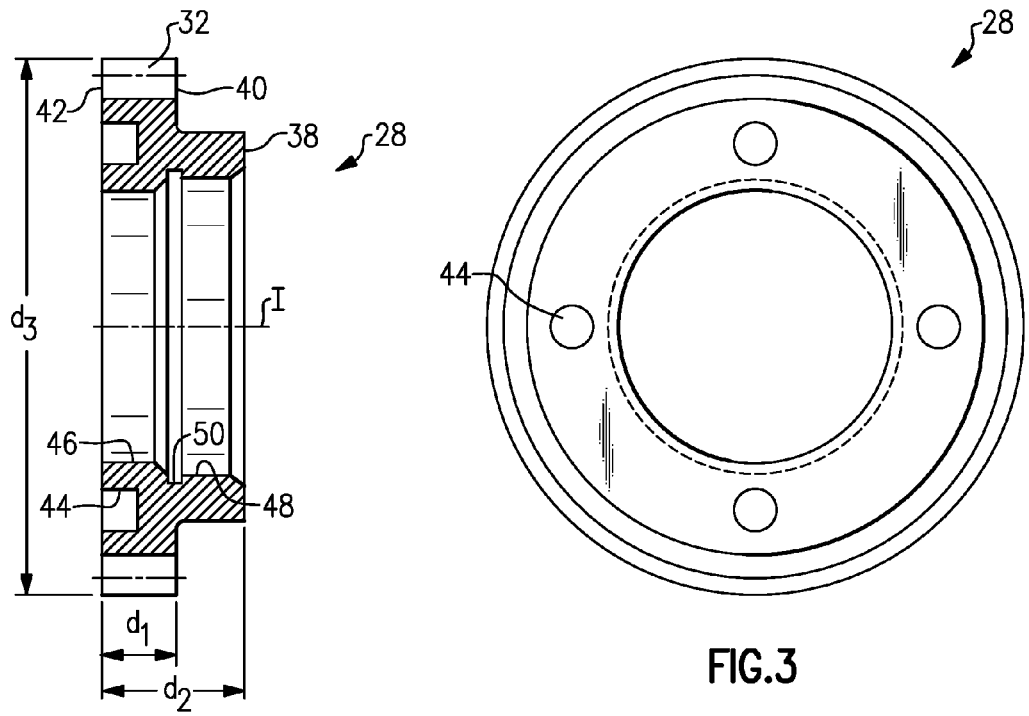
FIG.2
FIG.3
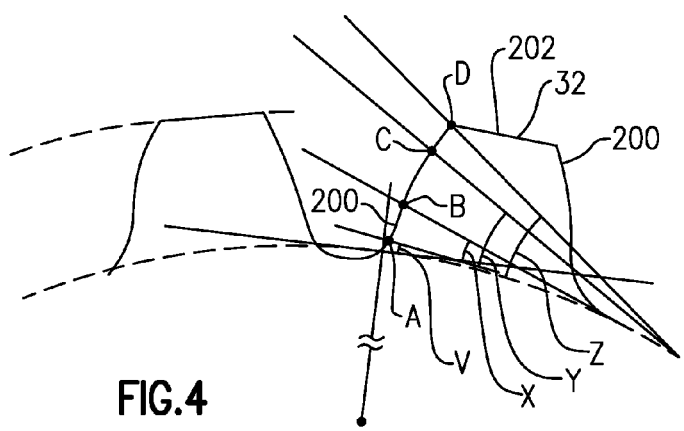
FIG.4

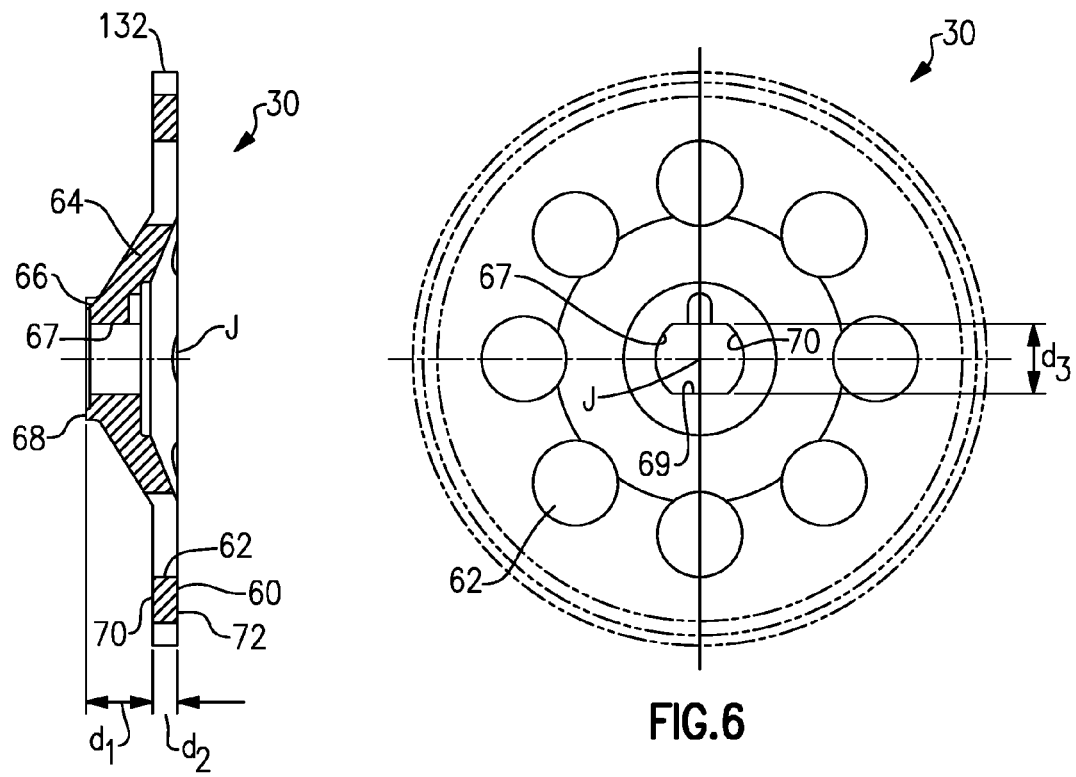
FIG.5
FIG.6
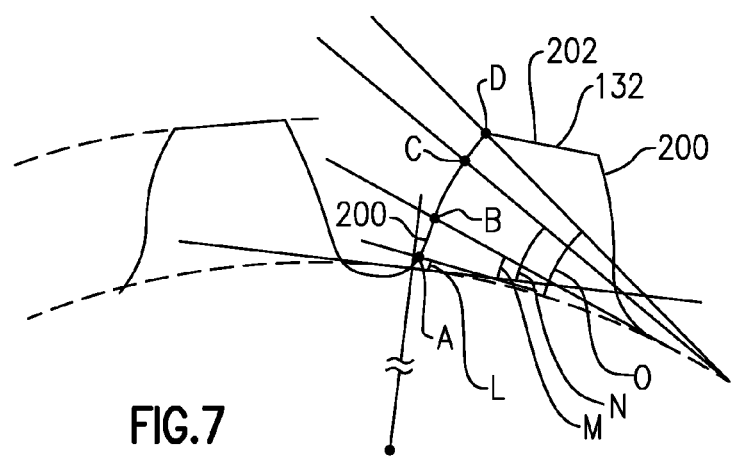
FIG.7

ELECTRIC GENERATOR OIL PUMP DRIVEN GEAR

BACKGROUND OF THE INVENTION

This application relates to details of a gear which is driven to, in turn, drive an oil pump for a generator.

Electrical generators are known and are often included in systems, such as a gas turbine engine. The generator generates electricity for use on an associated system. As an example, the electrical generator may generate electricity to power the gas turbine engine and, further, for uses on an associated aircraft.

The generator includes a number of components which rotate at relatively high speeds. Some generators may also be powered to begin rotation of components in the gas turbine engine for use as a starter.

Lubrication systems are known to provide lubricant to components within the electrical generator. In such systems, an oil pump is typically driven by a shaft from the electrical generator.

In one known type of electrical generator, a shaft which is driven as part of the electrical generator carries a drive gear which engages a driven gear. The driven gear, in turn, rotates a pump rotor for an oil pump which delivers oil back to the generator.

In the prior art, there have been challenges with properly mounting the drive and driven gears.

SUMMARY OF THE INVENTION

A driven gear drives a radially outwardly extending flange. The radially outwardly extending flange extends along an axial distance defined along a center axis of the flange. The flange merges into a generally conical portion which, in turn, extends radially inwardly to a hub. The hub extends to a remote end. A first distance is defined between the remote end of the hub and an end of the flange that faces the remote end. A second distance is defined between ends of the flange. Gear teeth are formed at an outer periphery of the flange. A ratio of the first distance to the second distance is between 2.54 and 2.824. An oil pump, a rotating portion for an electrical generator, and a generator are also disclosed.

These and other features may be best understood from the following drawings and specification.

BRIEF DESCRIPTION OF THE DRAWINGS

FIG. 2 shows a drive gear.
FIG. 3 is an end view of the FIG. 2 gear.
FIG. 4 shows a detail of a gear tooth.
FIG. 5 shows a driven gear.
FIG. 6 is an end view of the driven gear.
FIG. 7 shows a gear tooth for the driven gear.

DETAILED DESCRIPTION

Figure 1:
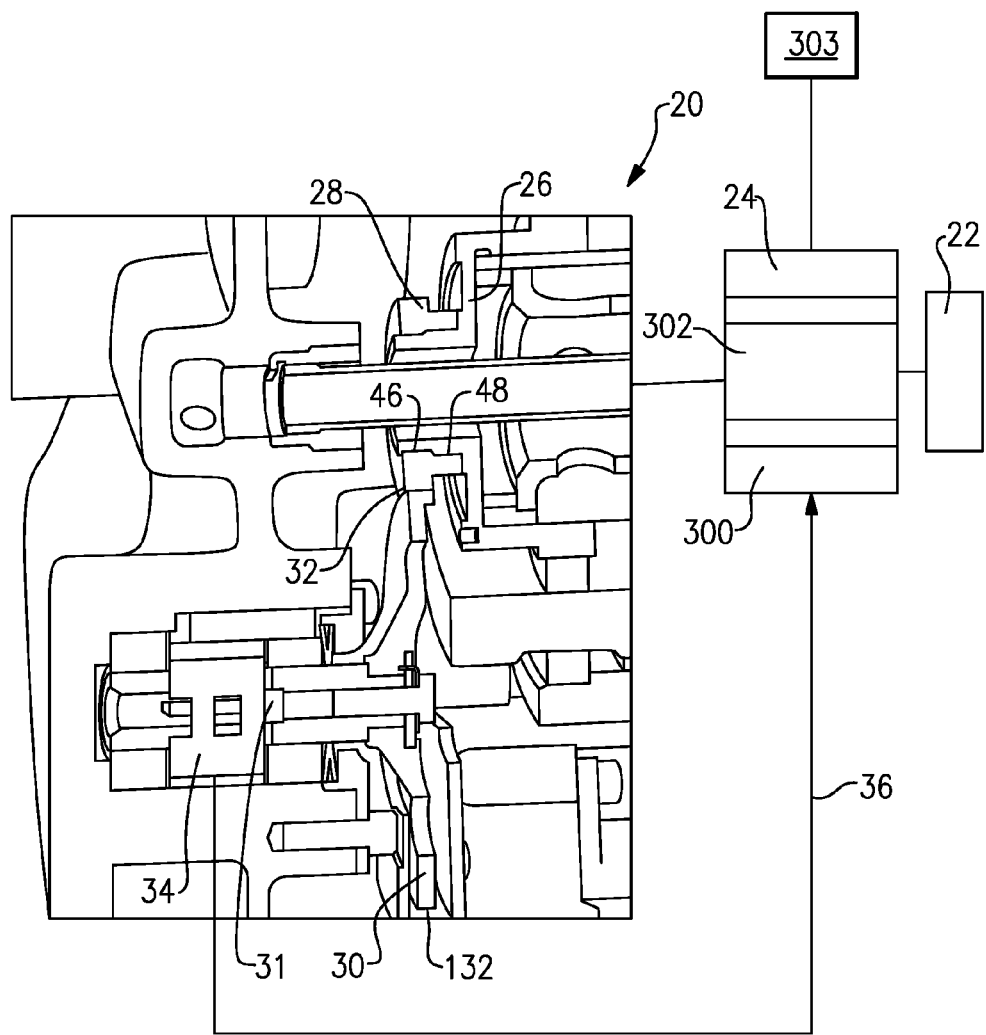
FIG. 1 schematically shows a generator and a drive pump.

FIG. 1 schematically shows a system 20 incorporating a gas turbine engine 22 which drives an electrical generator 24. The electrical generator 24 is driven by the gas turbine engine once the gas turbine engine is operating. In addition, as known, the generator 24 may also be driven in an opposed direction to begin rotation of the gas turbine engine at start up.

A hub 26 rotates with a shaft of the electrical generator and the hub 26 carries a drive gear 28. As shown, the drive gear 28 includes two distinct internal bore surfaces 46 and 48 with distinct portions on the hub 26 to properly position the gear 28.

The gear 28 has gear teeth 32 which engage gear teeth 132 on a driven gear 30. Driven gear 30 is engaged to rotate a drive shaft 31 for an oil pump rotor 34. Oil pump rotor 34 is shown schematically delivering oil through line 36 back to components in the generator 24.

FIG. 1 further shows a rotor 302 which carries electrical components and a stator 300 which also carries electrical components. In one example, one of the components may be permanent magnets while the other is electrical coils. These components operate, as known, to generate electricity which is sent to a use 303, which may be to power the gas turbine engine 22 or may be for other uses on an aircraft.

FIG. 2 shows details of the drive gear 28. As shown, a hub extends from end 38 to a remote end 42. The gear teeth 32 extend between the end 42 and a ledge 40. A distance $d_1$ can be defined along an axis I between the ends 40 and 42 and is also an axial extent of the teeth 32. The hub includes a mount extending from the ledge 40 to end 38.

An axial distance between the end 42 and the end 38 is shown as $d_2$. In one embodiment, $d_1$ was 0.220 inch (0.5588 centimeters) and $d_2$ was 0.423 inch (1.074442 centimeters). In embodiments, a ratio of $d_1$ to $d_2$ is between 0.520 and 0.544. As further shown, cutouts 44 are formed in an end face at remote end 42. A ditch 50 is shown between the threaded radially inner bore portion 46 and the radially outer bore portion 48.

A diameter $d_3$ to an outer diameter of the gear teeth 32 was 1.60 inches (4.06 centimeters). A ratio of $d_3$ to $d_1$ was between 6.93 and 7.28.

FIG. 3 shows an end of the drive gear 28 and shows there are four equal spaced cutouts 44, which are all cylindrical.

FIG. 4 shows a detail of a gear tooth 32. As shown, there are curved sides 200 and a relatively flat end 202. The curved sides 200 include four roll angles. A roll angle from a base of the side 200 to the point A was 7.66°. In embodiments, this roll angle is between 6.66 and 8.66. A roll angle X to the point B from the base of the side was 12.10° in one embodiment. In embodiments, the roll angle X was between 11.1° and 13.1°. A roll angle Y to the point C was 25.4° in one embodiment. In embodiments, the roll angle Y was between 24.4° and 25.4°. Finally, the roll angle Z to the point D at the outer end of the side 200 was 29.9°. In embodiments, the angle Z was between 28.9° and 30.9°. Points A-D represent locations along the tooth where roll angles are inspected with A at tooth base, and D at tooth tip.

FIG. 5 shows details of the driven gear 30. The gear teeth 132 are at an outer periphery and extend between an end 60 to an end 70 of a radially outwardly extending flange 60. Holes 62 extend through the flange 60.

A generally conical portion 64 merges the flange 60 into a base or hub 66. The hub 66 defines a remote end 68. A distance $d_1$ is defined along a central axis J between ends 68 and 70. A second diameter $d_2$ is defined along the axis J between ends 70 and 72. In one embodiment, $d_1$ was 0.348 inch (0.88392 centimeters) and $d_2$ was 0.130 inch (0.3302 centimeters). In embodiments, a ratio of $d_1$ to $d_2$ was between 2.541 and 2.824.

FIG. 6 shows an end view of the gear 30. As shown, there are eight holes 62 each equally spaced about the axis J. The central hole 67 has opposed cylindrical portions 70 and intermediate flat portions 69. A distance to $d_3$ is defined through the axis J and between the flat portions 69. In one embodiment, $d_3$ is 0.378 inch (0.96 centimeters). In embodiments, a ratio of $d_3$ to $d_1$ was between 1.06 and 1.10 inches (2.69 and 2.79 centimeters).

As shown in FIG. 7, the gear tooth 132 has angles L, M, N and O. In one embodiment, the angle L to the point A along the side 202 was 14.42°. In embodiments, the angle L was between 13.42° and 15.42°. In one embodiment, a roll angle M to the point B was 16.7°. In embodiments, the roll angle M is between 15.7° and 17.7°. In an embodiment, the roll angle N to the point C was 23.54°. In embodiments, the roll angle N is between 22.54° and 24.54°. In an embodiment, the roll angle O to the point D was 25.82°. In embodiments, the roll angle O is between 24.82° and 26.82°.

With the disclosed sizing and location of the various components, the location of the gears 30 and 28 on the respective shafts is proper. In addition, the roll angles result in the gears transmitting rotation more effectively.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A driven gear to drive an oil pump for a generator comprising:
    a driven gear including a radially outwardly extending flange, said radially outwardly extending flange extending along an axial distance defined along a center axis of said flange, said flange merging into a generally conical portion which, in turn, extends radially inwardly to a hub, said hub extending to a remote end, and a first distance defined between said remote end of said hub and an end of said flange facing said remote end, and a second distance defined between ends of said flange, with gear teeth formed at an outer periphery of said flange;
    a ratio of said first distance to said second distance being between 2.54 and 2.82; and
    wherein said gear teeth have a flat outer end and curved sides, with there being four roll angles on each of said sides, with a first roll angle extending for 13.4° to 15.4°, a second roll angle extending for 15.7° to 17.7°, a third roll angle extending for 22.5° to 24.5°, and a fourth roll angle extending for 24.8° to 26.8°.

2. The driven gear as set forth in claim 1, wherein there are holes extending through said flange.

3. The driven gear as set forth in claim 2, wherein there eight of said holes all being cylindrical and equally spaced about the central axis.

4. The driven gear as set forth in claim 3, wherein a central bore in said hub includes a pair of generally cylindrical portions extending about a portion of said axis, and opposed flat portions between said generally cylindrical portions.

5. The driven gear as set forth in claim 4, wherein said flat portions are spaced by a distance between 0.375 and 0.378 inches (0.95 and 0.96 centimeters).

6. An oil pump for use in a generator comprising:
    a drive gear to be driven by a generator shaft and said drive gear engaging a driven gear, said driven gear driving a pump rotor;
    said driven gear including a radially outwardly extending flange, said radially outwardly extending flange extending along an axial distance defined along a center axis of said flange, said flange merging into a generally conical portion which, in turn, extends radially inwardly to a hub, said hub extending to a remote end, and a first distance defined between said remote end of said hub and an end of said flange facing said remote end, and a second distance defined between ends of said flange, with gear teeth formed at an outer periphery of said flange, and a ratio of said first distance to said second distance being between 2.54 and 2.82; and
    wherein said gear teeth have a flat outer end and curved sides, with there being four roll angles on each of said sides, with a first roll angle extending for 13.4° to 15.4°, a second roll angle extending for 15.7° to 17.7°, a third roll angle extending for 22.5° to 24.5°, and a fourth roll angle extending for 24.8° to 26.8°.

7. The oil pump as set forth in claim 6, wherein there are holes extending through said flange.

8. The oil pump as set forth in claim 7, wherein there eight of said holes all being cylindrical and equally spaced about the central axis.

9. The oil pump as set forth in claim 8, wherein a central bore in said hub includes a pair of generally cylindrical portions extending about a portion of said axis, and opposed flat portions between said generally cylindrical portions.

10. The oil pump as set forth in claim 9, wherein said flat portions are spaced by a distance between 0.375 and 0.378 inches (0.95 and 0.96 centimeters).

11. A rotating portion for an electrical generator comprising:
    a rotor hub carrying a drive gear to engage a driven gear; and
    said driven gear driving an oil pump rotor, said driven gear including a radially outwardly extending flange, said radially outwardly extending flange extending along an axial distance defined along a center axis of said flange, said flange merging into a generally conical portion which, in turn, extends radially inwardly to a hub, said hub extending to a remote end, and a first distance defined between said remote end of said hub and an end of said flange facing said remote end, and a second distance defined between ends of said flange, with gear teeth formed at an outer periphery of said flange, and a ratio of said first distance to said second distance being between 2.54 and 2.82; and
    wherein said gear teeth have a flat outer end and curved sides, with there being four roll angles on each of said sides, with a first roll angle extending for 13.4° to 15.4°, a second roll angle extending for 15.7° to 17.7°, a third roll angle extending for 22.5° to 24.5°, and a fourth roll angle extending for 24.8° to 26.8°.

12. The rotating portion for an electrical generator as set forth in claim 11, wherein there are holes extending through said flange.

13. The rotating portion for an electrical generator as set forth in claim 12, wherein there eight of said holes all being cylindrical and equally spaced about the central axis.

14. A generator comprising:
    a stator, and a rotor, electrical components on said stator and said rotor interacting to generate electricity when said rotor is rotated, said rotor having a rotor hub, said rotor hub carrying a drive gear, the drive gear engaging a driven gear which drives an oil pump;
    said driven gear to drive an oil pump for a generator, said driven gear including a radially outwardly extending flange, said radially outwardly extending flange extending along an axial distance defined along a center axis of said flange, said flange merging into a generally conical portion which, in turn, extends radially inwardly to a hub, said hub extending to a remote end, and a first distance defined between said remote end of said hub and an end of said flange facing said remote end, and a second distance defined between ends of said flange, with gear teeth formed at an outer periphery of said flange;

a ratio of said first distance to said second distance being between 2.54 and 2.82; and wherein said gear teeth have a flat outer end and curved sides, with there being four roll angles on each of said sides, with a first roll angle extending for 13.4° to 15.4°, a second roll angle extending for 15.7° to 17.7°, a third roll angle extending for 22.5° to 24.5°, and a fourth roll angle extending for 24.8° to 26.8°.

15. The generator as set forth in claim 14, wherein there are holes extending through said flange.

16. The generator as set forth in claim 15, wherein there eight of said holes all being cylindrical and equally spaced about the central axis.

\* \* \* \* \*

UNITED STATES PATENT AND TRADEMARK OFFICE
CERTIFICATE OF CORRECTION

PATENT NO. : 9,494,225 B2
APPLICATION NO. : 14/181849
DATED : November 15, 2016
INVENTOR(S) : Eric A. Brust Page 1 of 1

It is certified that error appears in the above-identified patent and that said Letters Patent is hereby corrected as shown below:

In the Claims

In Claim 3, Column 3, Line 48; after "there" insert --are--

In Claim 8, Column 4, Line 15; after "there" insert --are--

In Claim 13, Column 4, Line 52; after "there" insert --are--

In Claim 16, Column 5, Line 15; after "there" insert --are--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*